(12) United States Patent
Zhang et al.

(10) Patent No.: US 11,822,162 B2
(45) Date of Patent: Nov. 21, 2023

(54) WIDEBAND TERAHERTZ MODULATOR BASED ON GRADUAL OPENINGS

(71) Applicant: University of Electronic Science and Technology of China, Sichuan (CN)

(72) Inventors: Yaxin Zhang, Sichuan (CN); Shixiong Liang, Sichuan (CN); Xilin Zhang, Sichuan (CN); Ziqiang Yang Yang, Sichuan (CN); Zhihong Feng, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 414 days.

(21) Appl. No.: 16/856,054

(22) Filed: Apr. 23, 2020

(65) Prior Publication Data

US 2020/0249503 A1    Aug. 6, 2020

(30) Foreign Application Priority Data

Jul. 31, 2019    (CN) .......................... 201910703204.4

(51) Int. Cl.
*G02F 1/015*    (2006.01)

(52) U.S. Cl.
CPC .......... *G02F 1/015* (2013.01); *G02F 2203/13* (2013.01)

(58) Field of Classification Search
CPC ..... H04B 10/501; H04B 10/516; G02F 1/015; G02F 2203/13; H03C 1/36; H03C 7/025; H01L 29/205; H01L 29/66212; H01L 29/872; H01L 21/28581

See application file for complete search history.

(56) References Cited

U.S. PATENT DOCUMENTS

| | | | |
|---|---|---|---|
| 9,590,739 B2* | 3/2017 | Zhang | H04B 10/516 |
| 2017/0236912 A1* | 8/2017 | Zhang | H01L 29/205 |
| | | | 257/76 |
| 2017/0279410 A1* | 9/2017 | Zhang | H03C 7/025 |
| 2020/0335639 A1* | 10/2020 | Park | H01L 21/28581 |

* cited by examiner

*Primary Examiner* — Hibret A Woldekidan

(57) ABSTRACT

A wideband terahertz modulator based on gradual openings, which belongs to the technical field of electromagnetic functional devices, includes: a semiconductor substrate; an epitaxial layer provided on the semiconductor substrate; a modulation units array, a positive voltage loading electrode and a negative voltage loading electrode which are provided on the epitaxial layer; wherein each modulation unit in the modulation units array comprises a disconnected H-shaped structure, a metal electrode located below an end of the opening of the disconnected H-shaped structure, and a semiconductor doped heterostructure located below the opening of the disconnected H-shaped structure; wherein in the disconnected H-shaped structures, adjacent modulation units have different opening positions; in a same row, the opening positions are linearly distributed and have a certain slope, and inclination slopes of the opening positions of two adjacent rows are opposite.

5 Claims, 2 Drawing Sheets

WIDEBAND TERAHERTZ MODULATOR BASED ON GRADUAL OPENINGS

CROSS REFERENCE OF RELATED APPLICATION

The present application claims priority under 35 U.S.C. 119(a-d) to CN 201910703204.4, filed Jul. 31, 2019.

BACKGROUND OF THE PRESENT INVENTION

Field of Invention

The present invention relates to the technical field of electromagnetic functional devices, and more particularly to a wideband terahertz modulator based on gradual openings.

Description of Related Arts

With the rapid development of terahertz technology, the performance of various types of terahertz functional devices is also increasing. Among them, the terahertz modulator, as a core component in a terahertz wireless communication system and a terahertz imaging system, has important research value. A large number of studies have shown that the combination of semiconductors, $VO_2$, graphene, and meta-materials, and the external stimuli such as temperature, light, and electric fields can effectively control terahertz waves. By combining meta-materials and semiconductors, the resulting composite terahertz dynamic device can achieve the dynamic control of the terahertz wave amplitude and phase in a specific frequency point or frequency domain, and has the characteristics of both meta-materials and semiconductors. Among them, meta-material refers to an artificial electromagnetic structure formed by periodically or non-periodically arranging macro basic unit resonance structures with a specific geometric shape; wherein the resonance characteristics and electromagnetic characteristics of magnetic field applied can be controlled by a resonance unit designed.

A high electron mobility transistor (HEMT) is a field-effect transistor that operates by two-dimensional electron gas (2DEG) with high electron mobility. The carrier mobility of 2DEG in HEMT can reach above 2500 cm/(V·s), and the carrier concentration is above $10^{13}/cm^2$. The working voltage of HEMT is usually a few volts, which provides the basis for the research of THz modulators. A 2DEG-based terahertz modulator is adopted to set the HEMT into each structural unit to form a dynamic modulation area. There are thousands of transistor periodic arrays and artificial microstructure arrays in the modulator chip. Through the clever combination, the artificial microstructure array acts as both a frequency selective surface and a transistor control circuit, thereby reducing the complexity of the structure and greatly reducing the insertion loss.

At present, in a terahertz modulator utilizing a combination of HEMT and the meta-material, the effective modulation bandwidth is relatively narrow. Therefore, enhancing the modulation bandwidth of a terahertz modulator has become an important research direction.

SUMMARY OF THE PRESENT INVENTION

An object of the present invention is to provide a terahertz modulator which is based on gradual openings and dynamically tunable in a wide frequency band, which effectively increases a modulation bandwidth of the terahertz modulator.

Accordingly, in order to achieve the object mentioned above, a technical solution adopted by the present invention is as follows.

A wideband terahertz modulator based on gradual openings comprising: a semiconductor substrate 1; an epitaxial layer 2 provided on the semiconductor substrate; a modulation units array, a positive voltage loading electrode and a negative voltage loading electrode which are provided on the epitaxial layer; wherein each modulation unit in the modulation units array comprises a disconnected H-shaped structure, a metal electrode located below an end of the opening of the disconnected H-shaped structure, and a semiconductor doped heterostructure located below the opening of the disconnected H-shaped structure; wherein the semiconductor-doped heterostructure is in ohmic contact with one end of the opening of the H-shaped structure through the metal electrode, and the semiconductor doped heterostructure is in Schottky contact at the other end of the opening of the H-shaped structure; wherein in the disconnected H-shaped structures, adjacent modulation units have different opening positions; in a same row, the opening positions are linearly distributed and have a certain slope, and inclination slopes of the opening positions of two adjacent rows are opposite; horizontal branches of the H-shaped structure that are disconnected in the same row are connected in sequence to connect the positive voltage loading electrode and the negative voltage loading electrode respectively through feeder lines.

Furthermore, the semiconductor doped heterostructure is a high electron mobility transistor, and on/off of a region is controlled electrically.

Furthermore, a material of the disconnected H-shaped structure and the feeder lines is Au, Ag, Cu, Al or the like.

Furthermore, a material of the metal electrode is Ti, Al, Ni, Au, or the like.

Furthermore, the semiconductor substrate is made of sapphire, high-resistance silicon, or silicon carbide.

Compared with the prior art, the beneficial effects of the present invention are as follows.

1. In the wideband terahertz modulator based on the gradual openings provided by the present invention, the positions of the openings in adjacent modulation units are different, so that the lengths of adjacent resonant metal rods are different, and there are multiple resonance modes when the HEMT is off, in such a manner that the modulation bandwidth is increased, the modulation bandwidth can reach 100 GHz.
2. In the wideband terahertz modulator based on the gradual openings provided by the present invention, the amplitude modulation mechanism is to take advantage of the high electron mobility characteristics of two-dimensional electron gas in HEMT to quickly control the resonance mode conversion of artificial electromagnetic medium so that the resonance structure has multiple resonance modes in the HEMT on-off state, thereby increasing the modulation bandwidth.
3. In the wideband terahertz modulator based on the gradual openings provided by the present invention, the modulation unit is a two-dimensional planar structure, which can be realized by micro-fabrication. The process is mature and easy to prepare, which avoids the difficult processing caused by the design solution of complex three-dimensional structure.

4. The wideband terahertz modulator based on the gradual openings provided by the present invention is a transmission-mode terahertz wave modulator, which is simpler to operate and more convenient to use compared with a reflective modulator.

DETAILED DESCRIPTION OF THE PREFERRED EMBODIMENT

The technical solution of the present invention is described in detail below with reference to the drawings and embodiments.

The present invention skillfully combines HEMT with meta-materials, uses HEMT with high-speed dynamic characteristics and meta-materials to control electromagnetic waves, and changes two-dimensional electron gas concentration in HEMT through electric control, thereby achieving on-off at the opening to achieve a purpose of mode conversion.

Figure 1:
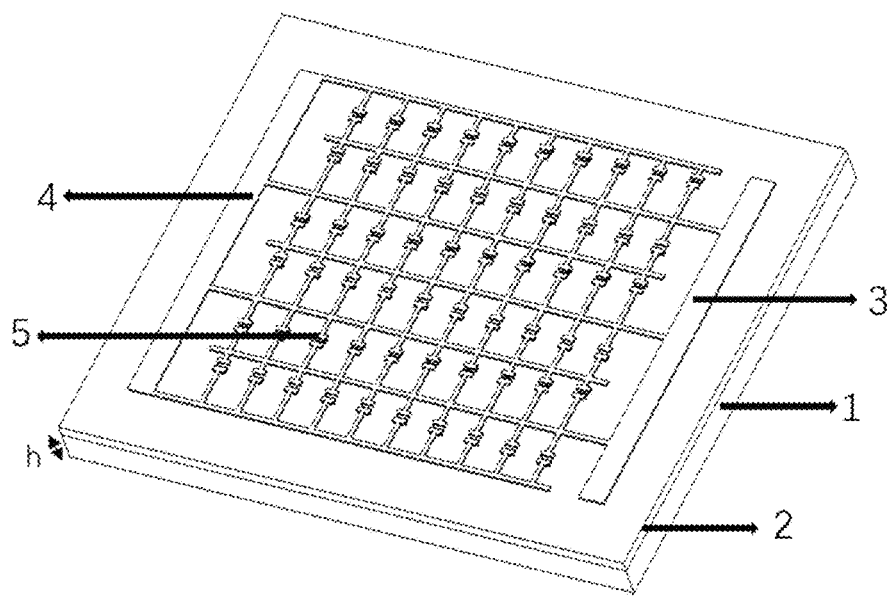
FIG. 1 is a schematic diagram of an overall structure of a wideband terahertz modulator based on graduated openings provided by the present invention; wherein: 1—semiconductor substrate; 2—epitaxial layer; 3—positive voltage loading electrode; 4—negative voltage loading electrode; 5—modulation units array.
Figure 2:
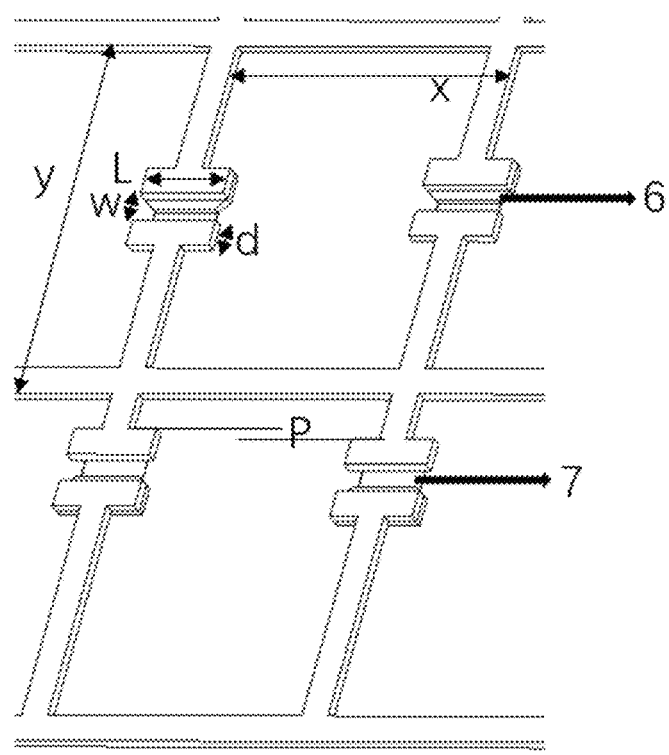
FIG. 2 is a schematic structural diagram of four modulation units in the wideband terahertz modulator based on the gradation openings provided by the present invention; wherein 6—metal electrode and 7—semiconductor-doped heterojunction structure.

As shown in FIG. 1, FIG. 1 is a schematic diagram of an overall structure of a wideband terahertz modulator based on graduated openings provided by the present invention. A wideband terahertz modulator based on gradual openings comprising: a semiconductor substrate 1; an epitaxial layer 2 provided on the semiconductor substrate; a modulation units array 5, a positive voltage loading electrode 3 and a negative voltage loading electrode 4 which are provided on the epitaxial layer; as shown in FIG. 2 which is a schematic diagram of four modulation units, wherein each modulation unit in the modulation units array comprises a disconnected H-shaped structure, a metal electrode 6 located below an end of the opening of the disconnected H-shaped structure, and a semiconductor doped heterostructure 7 located below the opening of the disconnected H-shaped structure; wherein an opening of the metal electrode is in ohmic contact with one end of the H-shaped structure through the metal electrode, and an opening end of an non-metal electrode is in Schottky contact (direct contact) at the other end of the H-shaped structure; wherein in the disconnected H-shaped structures, adjacent modulation units have different opening positions; in a same row, the opening positions are linearly distributed and have a certain slope, and inclination slopes of the opening positions of two adjacent rows are opposite; horizontal branches of the H-shaped structure that are disconnected in the same row are connected in sequence to connect the positive voltage loading electrode and the negative voltage loading electrode respectively through feeder lines.

In adjacent modulation units, the disconnected H-shaped structures have different opening positions; in a same row, the opening positions are linearly distributed and have a certain slope, and inclination slopes of the opening positions of two adjacent rows are opposite. Therefore, two rows of small unit structures can be regarded as one large unit structure, i.e., the large unit structures are identical. Horizontal branches of the H-shaped structure that are disconnected in the same row are connected in sequence to connect the positive voltage loading electrode and the negative voltage loading electrode respectively through feeder lines. Because two adjacent rows are connected and communicated, the same horizontal branch feeds both the upper and lower rows. Through electrical control, the on-off of the semiconductor doped heterostructure below the opening is controlled, thereby achieving mode conversion to achieve dynamic real-time regulation of the terahertz wave passing through the device.

The upper and lower ends of the opening of each modulation unit are respectively connected to the positive voltage loading electrode and the negative voltage loading electrode, and a metal structure connected to the positive voltage loading electrode is connected to the semiconductor doped heterojunction through an ohmic contact at the opening. The metal structure connected to the negative voltage loading electrode is connected to the semiconductor doped heterostructure through a Schottky contact at the opening, thereby achieving voltage control at the opening.

The semiconductor substrate is sapphire, high-resistance silicon, or silicon carbide. The epitaxial layer is a semiconductor material that can form a heterojunction, such as AlGaN/GaN, InGaN/GaN, AlGaAs/GaAs, etc. The material of the metal electrode is Ti, Al, Ni, Au, etc. The material of the disconnected H-shaped structure, the positive and negative voltage loading electrodes, and the feeder is Au, Ag, Cu, or Al, or the like.

Figure 3:
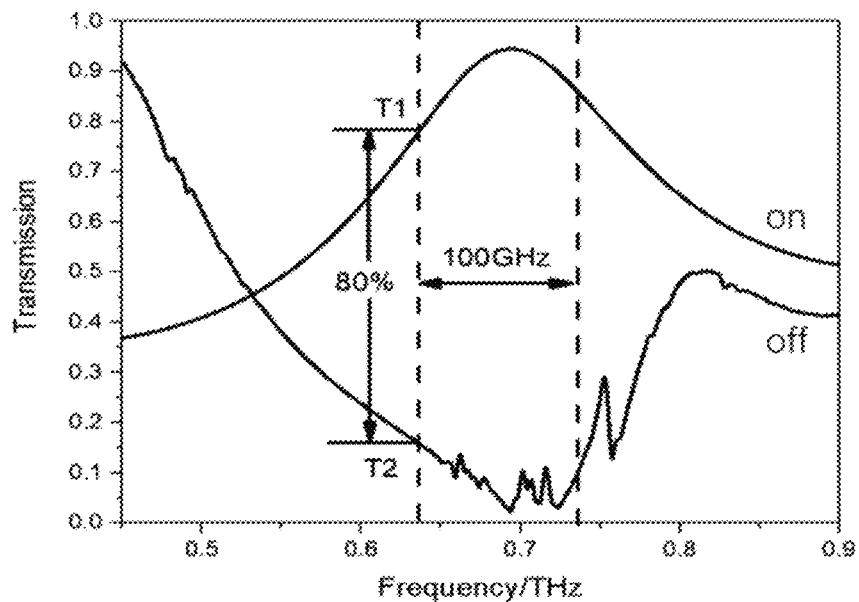
FIG. 3 is an electric field distribution curve of the wideband terahertz modulator based on the gradual openings according to a preferred embodiment of the present invention in two states of HEMT off (off) and on (on).
Figure 4:
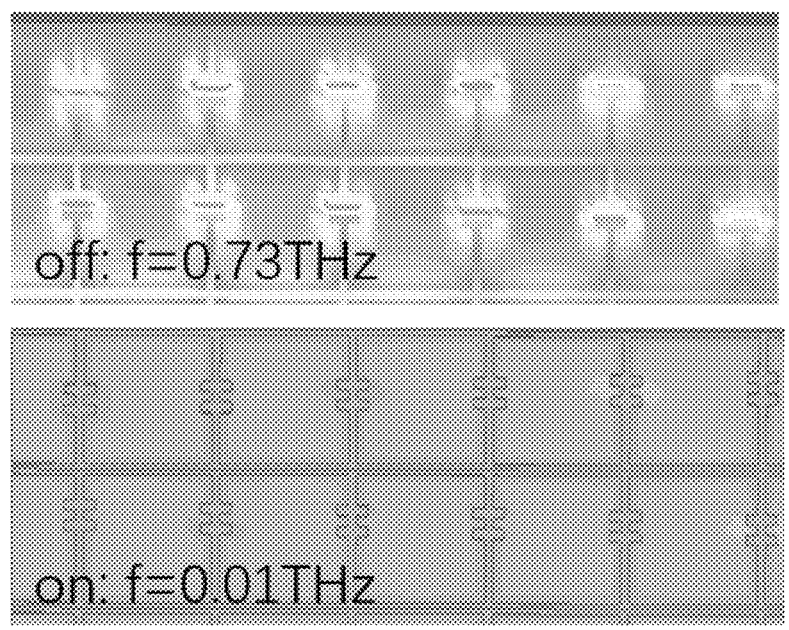
FIG. 4 is a simulation of the transmittance of a modulator in the wideband terahertz modulator based on the gradual openings according to the preferred embodiment of the present invention, with the HEMT being off (off) and on (on).

A wideband terahertz modulator is provided by the embodiment, wherein a size parameter of the modulation unit is: x=70 μm, y=54 μm, d=4 μm, W=4 μm, L=16 μm, p=1 μm, h=85 μm; an amount of the modulation units is 4*10; the opening positions of the modulation units in a first row are sequentially increased, and an opening positions of the modulation units in a second row are sequentially decreased, and the slopes of the first row and the second row are opposite numbers to each other. The modulation mechanism of the modulator is to control concentration of the two-dimensional electron gas in the HEMT by an applied voltage, and then control the transition of the resonance mode in each large unit structure. The specific modulation process is as follows. In the modulator, the negative voltage loading electrode is connected to a negative voltage, and the positive voltage loading electrode is connected to a positive voltage. When a difference of the positive and negative voltage is 0, the HEMT is in an on state, and the H-shaped openings are connected by the HEMT below. Because two adjacent rows are also connected together, in the same direction as the incident electric field, it is equivalent to a fully connected metal rod, the resonance frequency of which tends to 0; when the difference of the positive and negative voltage increases to cause a result that two-dimensional electron gas in the HEMT below the opening is depleted, the HEMT becomes pinch-off. In the large unit structure, the opening is disconnected, so a row of highly graded metal is formed in the same direction as the incident electric field, which causes different resonance frequency points, and widens the resonance frequency point within a certain range. FIG. 3 and FIG. 4 are respectively an electric field distribution curve and transmittance of the modulator of the wideband terahertz modulator based on the gradual openings according to the preferred embodiment of the present invention when the HEMT is off and on. The result indicates that the modulator obtained in the preferred embodiment can reach a modulation depth of more than 80% in a frequency range of 0.64 THz to 0.74 THz (100 GHz).

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wideband terahertz modulator based on gradual openings comprising: a semiconductor substrate 1; an epitaxial layer 2 provided on the semiconductor substrate; a modulation units array 5, a positive voltage loading electrode 3 and a negative voltage loading electrode 4 which are provided on the epitaxial layer; wherein each modulation unit in the modulation units array comprises a disconnected H-shaped structure, a metal electrode 6 located below an end of the opening of the disconnected H-shaped structure, and a semiconductor doped heterostructure 7 located below the opening of the disconnected H-shaped structure; wherein an opening of the metal electrode is in ohmic contact with one end of the H-shaped structure through the metal electrode, and an opening end of a non-metal electrode is in Schottky contact at the other end of the H-shaped structure; wherein in the disconnected H-shaped structures, adjacent modulation units have different opening positions; in a same row, the opening positions are linearly distributed and have a slope, and inclination slopes of the opening positions of two adjacent rows are opposite; horizontal branches of the H-shaped structure that are disconnected in the same row are connected in sequence to connect the positive voltage loading electrode and the negative voltage loading electrode respectively through feeder lines.

2. The wideband terahertz modulator based on the gradual openings, as recited in claim 1, wherein in adjacent modulation units, the disconnected H-shaped structures have different opening positions; in a same row, the opening positions are linearly distributed and have a slope, and inclination slopes of the opening positions of two adjacent rows are opposite, so two rows of small unit structures is regarded as one large unit structure; horizontal branches of the H-shaped structure that are disconnected in the same row are connected in sequence to connect the positive voltage loading electrode and the negative voltage loading electrode respectively through feeder lines; because two adjacent rows are connected and communicated, the same horizontal branch feeds both the upper and lower rows; through electrical control, the on-off of the semiconductor doped heterostructure below the opening is controlled, thereby achieving mode conversion to achieve dynamic real-time regulation of the terahertz wave passing through the device.

3. The wideband terahertz modulator based on the gradual openings, as recited in claim 1, wherein the semiconductor substrate is sapphire, high-resistance silicon, or silicon carbide; the epitaxial layer is a semiconductor material that can form a heterojunction, comprising: AlGaN/GaN, InGaN/GaN,or AlGaAs/GaAs; the material of the metal electrode is Ti, Al, Ni, Au; the material of the disconnected H-shaped structure, the positive and negative voltage loading electrodes, and the feeder is Au, Ag, Cu, or Al.

4. The wideband terahertz modulator based on the gradual openings, as recited in claim 1, the opening positions of the modulation units in a first row are sequentially increased, and an opening positions of the modulation units in a second row are sequentially decreased, and the slopes of the first row and the second row are opposite numbers to each other; the modulation mechanism of the modulator is to control concentration of the two-dimensional electron gas in the HEMT a high electron mobility transistor (HEMT) by an applied voltage, and then control the transition of the resonance mode in each large unit structure; the specific modulation process is as follows; in the modulator, the negative voltage loading electrode is connected to a negative voltage, and the positive voltage loading electrode is connected to a positive voltage; when a difference of the positive and negative voltage is 0, the HEMT is in an on state, and the H-shaped openings are connected by the HEMT below; because two adjacent rows are also connected together, in the same direction as the incident electric field, it is equivalent to a fully connected metal rod, the resonance frequency of which tends to 0; when the difference of the positive and negative voltage increases to cause a result that two-dimensional electron gas in the HEMT below the opening is depleted, the HEMT becomes pinch-off; in the large unit structure, the opening is disconnected, so a row of highly graded metal is formed in the same direction as the incident electric field, which causes different resonance frequency points, and widens the resonance frequency point within a range.

5. A wideband terahertz modulator based on gradual openings comprising: a semiconductor substrate 1; an epitaxial layer 2 provided on the semiconductor substrate; a modulation units array 5, a positive voltage loading electrode 3 and a negative voltage loading electrode 4 which are provided on the epitaxial layer; wherein each modulation unit in the modulation units array comprises a disconnected H-shaped structure, a metal electrode 6 located below an end of the opening of the disconnected H-shaped structure, and a semiconductor doped heterostructure 7 located below the opening of the disconnected H-shaped structure; wherein an opening of the metal electrode is in ohmic contact with one end of the H-shaped structure through the metal electrode, and an opening end of a non-metal electrode is in Schottky contact at the other end of the H-shaped structure; wherein in the disconnected H-shaped structures, adjacent modulation units have different opening positions; in a same row, the opening positions are linearly distributed and have a slope, and inclination slopes of the opening positions of two adjacent rows are opposite; horizontal branches of the H-shaped structure that are disconnected in the same row are connected in sequence to connect the positive voltage loading electrode and the negative voltage loading electrode respectively through feeder lines; wherein the upper and lower ends of the opening of each modulation unit are respectively connected to the positive voltage loading electrode and the negative voltage loading electrode, and a metal structure connected to the positive voltage loading electrode is connected to the semiconductor doped heterojunction through an ohmic contact at the opening; the metal structure connected to the negative voltage loading electrode is connected to the semiconductor doped heterostructure through a Schottky contact at the opening, thereby achieving voltage control at the opening; wherein the semiconductor substrate is sapphire, high-resistance silicon, or silicon carbide; the epitaxial layer is a semiconductor material that can form a heterojunction, comprising: AlGaN/GaN, InGaN/GaN,or AlGaAs/GaAs; the material of the metal electrode is Ti, Al, Ni, Au; the material of the disconnected H-shaped structure, the positive and negative voltage loading electrodes, and the feeder is Au, Ag, Cu, or Al;

wherein a wideband terahertz modulator, the opening positions of the modulation units in a first row are sequentially increased, and an opening positions of the modulation units in a second row are sequentially decreased, and the slopes of the first row and the second row are opposite numbers to each other; the modulation mechanism of the modulator is to control concentration of the two-dimensional electron gas in an HEMT (high electron mobility transistor) by an applied voltage, and then control the transition of the resonance mode in each large unit structure; the specific modulation process is as follows; in the modulator, the negative voltage loading electrode is connected to a negative voltage, and the positive voltage loading electrode is connected to a positive voltage; when a difference of the positive and negative voltage is 0, the HEMT is in an on state, and the H-shaped openings are connected by the HEMT below; because two adjacent rows are also connected together, in the same direction as the incident electric field, it is equivalent to a fully connected metal rod, the resonance frequency of which tends to 0; when the difference of the positive and negative voltage increases to cause a result that two-dimensional electron gas in the HEMT below the opening is depleted, the HEMT becomes pinch-off; in the large unit structure, the opening is disconnected, so a row of highly graded metal is formed in the same direction as the incident electric field, which causes different resonance frequency points, and widens the resonance frequency point within a range.

* * * * *